(12) United States Patent
Ganesh et al.

(10) Patent No.: US 7,334,004 B2
(45) Date of Patent: Feb. 19, 2008

(54) CONSISTENT READ IN A DISTRIBUTED DATABASE ENVIRONMENT

(75) Inventors: Amit Ganesh, San Jose, CA (US); Roger J. Bamford, Woodside, CA (US)

(73) Assignee: Oracle International Corporation, Redwood Shores, CA (US)

( * ) Notice: Subject to any disclaimer, the term of this patent is extended or adjusted under 35 U.S.C. 154(b) by 526 days.

(21) Appl. No.: 10/119,672

(22) Filed: Apr. 9, 2002

(65) Prior Publication Data
US 2002/0194206 A1  Dec. 19, 2002

Related U.S. Application Data

(60) Provisional application No. 60/295,104, filed on Jun. 1, 2001.

(51) Int. Cl.
*G06F 17/30* (2006.01)
(52) U.S. Cl. .................. 707/203; 707/201; 707/200
(58) Field of Classification Search ............ 707/100, 707/104.1, 200–205
See application file for complete search history.

(56) References Cited

U.S. PATENT DOCUMENTS

| | | | | |
|---|---|---|---|---|
| 5,333,265 A | * | 7/1994 | Orimo et al. | 709/201 |
| 5,454,102 A | * | 9/1995 | Tang et al. | 707/3 |
| 5,574,906 A | * | 11/1996 | Morris | 707/1 |
| 5,806,076 A | * | 9/1998 | Ngai et al. | 707/203 |
| 5,870,758 A | | 2/1999 | Bamford et al. | |
| 5,924,096 A | * | 7/1999 | Draper et al. | 707/10 |
| 5,956,731 A | | 9/1999 | Bamford et al. | |
| 5,974,427 A | | 10/1999 | Reiter | |
| 5,991,771 A | * | 11/1999 | Falls et al. | 707/202 |
| 6,014,669 A | * | 1/2000 | Slaughter et al. | 707/10 |
| 6,192,377 B1 | | 2/2001 | Ganesh et al. | |
| 6,353,835 B1 | * | 3/2002 | Lieuwen | 707/203 |
| 6,393,485 B1 | * | 5/2002 | Chao et al. | 709/231 |
| 6,516,327 B1 | * | 2/2003 | Zondervan et al. | 707/200 |

(Continued)

FOREIGN PATENT DOCUMENTS

EP  0 501 180 A  9/1992

(Continued)

OTHER PUBLICATIONS

Michael Teschke and Achim Ulbrich. Concurrent Warehouse Maintenance Without Comprising Session Consistency. Pub. 1998.*

(Continued)

*Primary Examiner*—Neveen Abel-Jalil
(74) *Attorney, Agent, or Firm*—Hickman, Palermo, Truong & Becker LLP; Christian A. Nichole

(57) ABSTRACT

Techniques are provided for determining which data item version to supply to a query. According to the techniques, the determination is made by associating a new field, which indicates the time a data item version was current, with each data item version; associating a new field with each query, which indicates the last change that the query must see made by the transaction to which the query belongs; and determining which data item version to use to answer the query based, in part, on a comparison between the values of the two new fields.

18 Claims, 5 Drawing Sheets

U.S. PATENT DOCUMENTS

| | | | |
|---|---|---|---|
| 6,574,717 B1 * | 6/2003 | Ngai et al. | 711/147 |
| 6,839,751 B1 * | 1/2005 | Dietz et al. | 709/224 |
| 7,024,656 B1 * | 4/2006 | Ahad | 717/116 |
| 2002/0133508 A1 * | 9/2002 | LaRue et al. | 707/202 |
| 2002/0165724 A1 * | 11/2002 | Blankesteijn | 705/1 |

FOREIGN PATENT DOCUMENTS

| | | |
|---|---|---|
| EP | 0 501 180 A2 | 9/1992 |

OTHER PUBLICATIONS

Costas Vassilakis et al. Implementation of Transaction and Concurrency Control Support in a Temporal DBMS. Information Systems, vol. 23. No. 5. Pub. 1998.*

Paul M. Bober, et al., "On Mixing Queries and Transactions via Multiversion Locking," 1992, IEEE, pp. 535-545.

C. Mohan, et al., "Efficient and Flexible Methods for Transient Versioning of Records to Avoid Locking by Read-Only Transactions," 1992, ACM SIGMOD-6/92/CA, USA, pp. 124-133.

Bober, Paul M., et al., "On Mixing Queries and Transactions via Multiversion Locking", Computer Sciences Department, University of Wisconsin, 1992, pp. 535-545.

Mohan, C., et al., "Efficient and Flexible Methods for Transient Versioning of Records to Avoid Locking by Read-Only Transactions", XP000393583, IBM Almaden Research Center, publication date Feb. 6, 1992, pp. 124-133.

Claims, EP02731965.6, 1 page.

European Patent Office, "Communication—European Search Report", Application No. 07003358.4-2201, dated May 18, 2007, 8 pages.

* cited by examiner

CONSISTENT READ IN A DISTRIBUTED DATABASE ENVIRONMENT

PRIORITY CLAIM AND CROSS-REFERENCE TO RELATED APPLICATIONS

This application is related to and claims domestic priority from prior U.S. Provisional Application Ser. No. 60/295,104, filed on Jun. 1, 2001, entitled "Consistent Read in a Distributed Database Environment", by Amit Ganesh and Roger J. Bamford, the entire disclosure of which is hereby incorporated by reference for all purposes as if fully set forth herein.

FIELD OF THE INVENTION

The present invention relates to accessing stored data in a distributed database environment, and more specifically, to a method and apparatus for determining which version of a data item to provide to a transaction that requests the data item.

BACKGROUND OF THE INVENTION

In typical database systems, users store, update, retrieve and select information by submitting commands or statements to a database application. To be correctly processed, the statements must comply with the database language that is supported by the database application. One popular database language is known as Structured Query Language (SQL).

A logical unit of work that is comprised of one or more database language statements is referred to as a transaction. Examples of database language statements would be insert, for inserting data into a database, and query, for selecting data in a database.

When multiple users share a database system, it is impractical to allow only one transaction to execute at a time. However, when many transactions are allowed to execute at the same time, the issue of consistency arises. Transactional database management systems provide a special statement—"commit"—which a user or program submits to delineate the statements that make up a transaction. Before a transaction commits, all changes made by the transaction are considered temporary, and will be removed if the transaction fails to commit. At the time a transaction commits, all changes made by the transaction are made permanent, and can thereafter be seen by other transactions.

To ensure predictable and reproducible results, techniques have been developed which protect concurrently executing transactions from interacting with one another in uncontrolled ways. Transactions are designed to make database changes in such a way that the database, as a whole, moves from one consistent state to another.

Not only must transactions leave the database in a consistent state upon completion, but transactions must also see the database in a consistent state. This condition is difficult to satisfy because there may be concurrently executing transactions, each of which may be causing a temporary inconsistency visible only within that single transaction. Consequently, transactions must not be able to see the changes made by concurrently executing transactions until those transactions commit.

One approach to ensure that a transaction, to which a query belongs, does not see changes made by concurrently executing transactions is to prevent transactions from reading a data item version that has been updated until the transaction that updated the data item version commits. However, this approach reduces the concurrency in the system by causing transactions that wish to read data item versions (readers) to wait for transactions that have written to data item versions (writers) to commit.

Another way to prevent a query from seeing the changes made by concurrently execution transactions is to assign a "snapshot time" to the query, and then (1) cause the query to see all changes made by transactions that committed before the snapshot time, and (2) prevent the query from seeing changes made by any transactions that commit after the snapshot time. More specifically, when a query is part of a transaction, the query must see: (1) all the changes that were committed to the database on or before the query's snapshot time and (2) all the changes that the transaction, to which the query belongs, has made (even though that transaction has not yet committed).

It is possible for multiple versions of the same data item to be in cache within a database system. These versions include (1) the current version of a data item (hereinafter referred to as the current version), which includes all changes that have been made to that data item up to the present point in time, and (2) clones of the current version, which are either copies of the current version, or copies of other clones, made at various points in time (hereinafter referred to as clones). The set consisting of the current version and the clones of the current version will be referred to as the "data item versions" of the data item.

When a query specifies retrieval of a data item, the database system must determine which of the various versions of the data item can be provided to the query. With respect to a given query, each version of a data item falls into one of two categories: (1) versions that contain everything that the query must see (and have changes in the future of what the query needs. These future changes may be rolled back but it is hard to move older versions of data items forward in time), and (2) versions that are missing changes that the query must see.

In general, versions of data items that fall into the first category relative to a particular query can be used to answer that particular query after any changes that the query cannot see have been removed from the version of the data items. The process of removing changes from a version of a data item is referred to as "rollback". Versions of data items that fall into the second category relative to a particular query cannot be used to answer that particular query.

One approach to providing data to a query would be to always start with the current version of a data item. By definition, the current version of the data item has all of the changes that have ever been made to the data item. Therefore, it always belongs to category 1 for all queries. Using the current version of the data item often requires (1) making a clone, and (2) rolling out of the clone all of the changes that the query should not see. However, if the snapshot time of the query is old, then there may be numerous changes that have to be removed from the clone, resulting in a rollback operation that consumes large amounts of time and resources. Furthermore, always rolling back changes from the current version only works well on a single node system because, in a multi-node system, a request for a data item could get caught in a situation of chasing the current version of the data item as current version is moved from node to node in a cluster.

If a system does not always start rollback operations using the current version, then the system must be able to determine which category clones fall into relative to the queries that the system is processing. If they fall into category one with respect to a given query, then they may be used to supply data to the query. To facilitate the categorization of clones, "removed-data information" may be stored with each data item version. The removed-data information generally indicates what changes made to a data item version have subsequently been removed from that version of the data item.

For example, assume that the current version of a data item is cloned to create clone X. Initially, the removed-data information of clone X will indicate that no data has been removed. If a rollback operation is performed on clone X to remove the changes made by transaction T1, then the removed-data information of clone X will be revised to indicate that the changes made by T1 have been removed from clone X. If a query does not need to see the changes made by T1, then clone X may be used to provide data to the query (additional rollbacks may be required). If the query needs to see the changes made by T1, then clone X cannot be used to provide data to the query.

Unfortunately, the removed-data information does not always accurately indicate all of the changes that (1) have been made to the data item, which (2) are not in the clone. Specifically, even when the removed-data information indicates that no data has been removed from a clone, there still remains the possibility that changes, which the query must see, are missing from the clone. Specifically, a query may have to see changes that were made to the current version subsequent to the creation of the clone. Therefore, this removed-data information is not sufficient to determine all data that may be missing from a data item version. In other words, a clone may be missing changes that have never been removed from the clone.

The following is an example of how a clone may end up missing data not reflected in the removed-data information of the clone. A transaction, TXB, is making updates to a current version. The current version is cloned, which results in clone Y. TXB continues to make updates to the current version. In this case, clone Y is now missing the updates that were made to the current version after it was cloned, but the removed-data information for clone Y does not indicate that any changes are missing.

One approach to indicate whether changes, not reflected in the removed-data information, are missing from a clone is to mark all existing clones as "old" when the current version of the data item is updated. The operation of marking clones as "old" is hereinafter referred to as invalidation. However, in a multi-node system (hereinafter referred to as a cluster) where the clones can be spread across many nodes, this is impractical because it would entail broadcasting an invalidation message for every update of every data item to all nodes in the cluster that could possibly include clones of the data item.

Based on the forgoing, what is needed is a mechanism for determining which data item versions can be provided to a query, where clones of the data item may reside in multiple nodes of a cluster.

SUMMARY OF THE INVENTION

According to one aspect of the invention, techniques are provided for determining which data item versions can be used to satisfy a query. The techniques described herein may be used in a cluster environment without the significant performance penalties of alternative techniques. In addition, techniques are provided for determining which versions would require the least amount of work to satisfy the needs of a query. According to one embodiment, the technique involves:

1) associating a first new field with each clone, where the first new field indicates the time a data item version was current, 2) associating a second new field with each query, where the second new field indicates the last change made by a transaction that the query must see, and 3) using the value of the first new field of a clone, and the value of the second new field of the query, to determine whether the clone can be supplied to the query.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE PREFERRED EMBODIMENT

A method and a system are described for supplying data item versions from a database to answer a query. In the following description, for the purposes of explanation, numerous specific details are set forth in order to provide a thorough understanding of the invention. It will be apparent, however, to one skilled in the art that the invention may be practiced without these specific details. In other instances, well-known structures and devices are shown in block diagram form in order to avoid unnecessarily obscuring the invention.

Functional Overview

Techniques are provided for locating a version of a data item, residing on one of a multitude of nodes in a cluster, for a query that must see a consistent snapshot of the database. As mentioned above, such queries must only see (1) changes that were committed to the database by a particular set of committed transactions, and (2) changes made by prior statements of the transaction to which the query belongs.

According to one embodiment, the techniques involve storing a CLONE-TIME with each clone, and a LAST-TO-SEE-TIMESTAMP with each query. The following sections describe how these additional information items are established, maintained, and used to determine whether a particular clone can be provided to a particular query.

Global System Time

The global system time is a counter maintained by the database system. Typically, this counter increases with time. To track the sequence of database events, the events are marked as having occurred in the database system as of the time indicated by the global system time. For example, an event that occurs at a global system time of 10 is considered to have occurred before something else that occurs when the global system time is 11. As shall be described in greater detail hereafter, the global system time is used to create timestamps used for both the CLONE-TIME of clones and LAST-TO-SEE-TIMESTAMP of queries.

Clone-Time

As mentioned above, removed-data information is stored with each clone to indicate what changes, if any, have been removed from the clone. However, the removed-data information does not indicate whether a clone is missing changes that were made to the current version after the clone was created. To facilitate tracking this later kind of missing changes, a "CLONE-TIME" is stored with every clone.

In general, the CLONE-TIME of a clone is a value that indicates the time at which the "clone branch" to which the clone belongs was cloned from the current version of the data item. The clone branch to which a particular clone belongs includes (1) all clones that were involved in the clone operations that produced the particular clone, and (2) all clones that the particular clone is used to produce.

Figure 2:
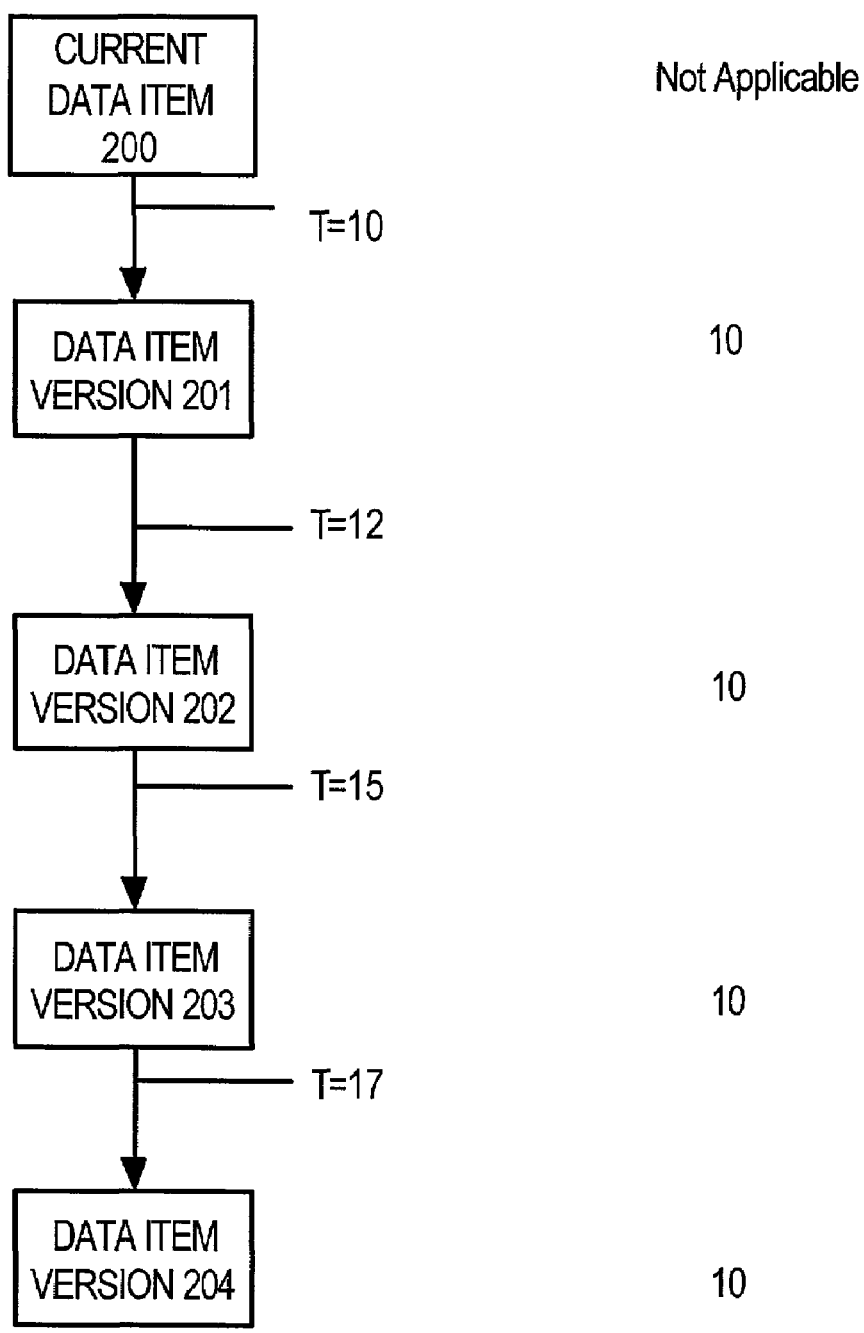
FIG. 2 is a block diagram of a clone branch.

The following scenario explains clones, clone branches, and CLONE-TIMES in more detail. Every non-current version of a data item was either cloned from a current version or from another non-current version of the data item. Thus, every non-current version of a data item is the product of a sequence of one or more clone operations. For example, FIG. 2 depicts a current version 200. At time T=10, a first clone 201 of the current version 200 is created from the current version. At the time that clone 201 is cloned from current version 200, it is assigned a CLONE-TIME from the global system time.

Clone 202 is a clone of clone 201. Clone 202 is cloned from clone 201 at T=12. Even though clone 201 is created at T=12, it belongs to a clone branch that was cloned from the current version 200 at T=10. Consequently, clone 202 is assigned the CLONE-TIME of T=10.

Clone 203, which is a clone of clone 202 made at T=15, is also assigned the CLONE-TIME of T=10. Clone 204, which is a clone of clone 203 made at T=17, is also assigned the CLONE-TIME of T=10. Thus, all of the clones (201, 202, 203, and 204) belong to the same clone branch, and all have the same CLONE-TIME T=10 that was initially assigned to clone 201.

Thus, the CLONE-TIME assigned to a clone made directly from the current version is the global system time at which the clone is created. The CLONE-TIME assigned to a clone made from another clone is the CLONE-TIME of the other clone from which it is made.

By using the removed-data information in conjunction with the CLONE-TIME, it is possible to know that all changes made to a data item prior to the CLONE-TIME are either (1) reflected in the data item version, or (2) identified as removed by the removed-data information.

LAST-TO-SEE-TIMESTAMP

According to one embodiment, in addition to assigning a CLONE-TIME to each clone, a LAST-TO-SEE-TIMESTAMP is assigned to each query that must see a consistent view of the database. According to one embodiment, the LAST-TO-SEE-TIMESTAMP assigned to a query that is part of a transaction is the value of the global system time when that transaction made the most recent change that the query must see.

For example, assume that a query Q1 is part of a transaction TX1 that has made 5 changes to the database, at times T=1, T=2, T=3, T=4 and T=5, respectively. Assume that Q1 must see the first 3 changes of TX 1. Under these conditions, the LAST-TO-SEE-TIMESTAMP assigned to Q1 is T=3, the global system time at which TX1 made its third change.

Comparing Clone-Time to
LAST-TO-SEE-TIMESTAMP

Typically, the removed-data information of a clone indicates the commit time of the most recent transaction whose changes are reflected in the clone. For the purposes of explanation, this value shall be referred to herein as the MOST-RECENT-INCLUSION-TIME.

Thus, if a clone includes data from transactions that committed at times 10, 12 and 15, then the MOST-RECENT-INCLUSION-TIME of the clone will indicate a commit time of 14, which is the commit time of the transaction (e.g., 15) minus one. If the changes made by the transaction that committed at time 15 are removed from the clone, then the MOST-RECENT-INCLUSION-TIME will be changed to 12.

In the past, a clone could not be used to satisfy a query if the clone had a MOST-RECENT-INCLUSION-TIME that was earlier than the snapshot time of a query, even if the removed-data information of the clone indicated that no changes had been removed from the clone. For example, a query with a snapshot time of 20 could not be satisfied using a clone with a MOST-RECENT-INCLUSION-TIME of 14, even if the removed-data information of the clone indicated that no changes had been removed from the clone. The clone could not be used because it was possible for changes to have been made to the current version (1) after the creation of the clone, and (2) before the snapshot time of the query. Furthermore, in the past invalidation of data item versions were invalidated locally and remote data item versions could not be used because global invalidation is expensive.

By maintaining a LAST-TO-SEE-TIMESTAMP with the query, and a CLONE-TIME with a clone, it is possible to use data item versions across the cluster without doing invalidation. Specifically, if the CLONE-TIME of a clone is greater than or equal to the LAST-TO-SEE-TIMESTAMP of a query, and the snapshot time is less than the MOST-RECENT-INCLUSION-TIME, then the data item version may be used.

According to one embodiment, the LAST-TO-SEE-TIMESTAMP is set to the value of the global system time to indicate the time that the transaction made the change associated with a "SEQUENCE-NUMBER-OF-LAST-CHANGE" value. The SEQUENCE-NUMBER-OF-LAST-CHANGE is the sequence number of the highest change, which the query must see, that was made by the transaction to which the query belongs.

Data Maintained for a Data Item Version

As stated before, there are two ways that a data item version maybe missing changes that a query needs to see: 1) changes that are rolled out of the data item version and 2) changes, which are made to the current version of the data item after the data item version was cloned from the current version of the data item. The changes that are rolled out of a data item version are referred to as "removed data" and the information required to track this data is referred to as "removed-data information".

Removed-data information is associated with every data item version. This removed-data information includes the following:

1) Most-Recent-Inclusion-Time:

the commit time of the most recent transaction whose changes have not been removed from the data item version. For the current version of a data item, the MOST-RECENT-INCLUSION-TIME is always infinity. When changes are rolled out of a data item version, the MOST-RECENT-INCLUSION-TIME of the data item version is updated to reflect the commit time of the most recent transaction to modify the data item version whose changes have not been rolled out of the data item version. For example, if transactions TXA, TXB, and TXC committed changes to a particular data item version respectively at times 5, 10, 15, and then changes from TXC are rolled out, the MOST-RECENT-INCLUSION-TIME will be set to 10. If the changes from TXB are rolled out, then the MOST-RECENT-INCLUSION-TIME will be set to 5.

2) Latest-Missing-Transaction:

the identifier of the last transaction whose change(s) are missing from the data item version. In other words, LATEST-MISSING-TRANSACTION is the transaction identification of the transaction that last rolled out changes from the data item version.

3) Sequence-Number-of-Most-Recent-Missing-Change:

the sequence number of the most recent and missing change made by the LATEST-MISSING-TRANSACTION. For example, assume that the LATEST-MISSING-TRANSACTION made four changes to a particular data item, where the four changes were associated with sequence numbers 11, 25, 32, and 50. If none of the changes have been rolled out of the data item version, then the SEQUENCE-NUMBER-OF-MOST-RECENT-MISSING-CHANGE is zeroed out. If all of the changes are removed, then the SEQUENCE-NUMBER-OF-MOST-RECENT-MISSING-CHANGE is set to 11.

4) Other-Transactions-Rolled-Out-Indicator:

a bit which is set if changes, made by transactions other than the LATEST-MISSING-TRANSACTION, have been rolled out from this data item version.

Figure 1:
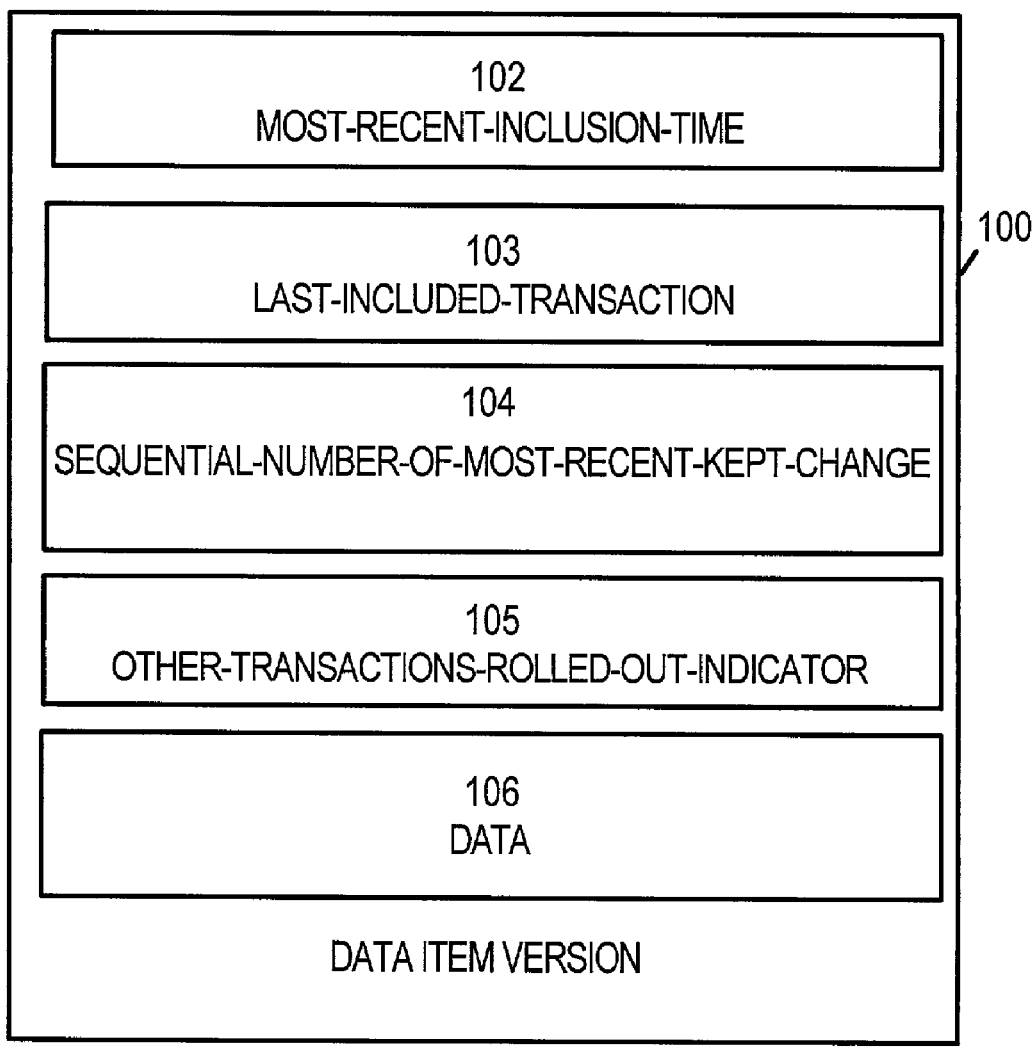
FIG. 1 is a block diagram of a data item version and transactions that have updated it.
Figure 1:
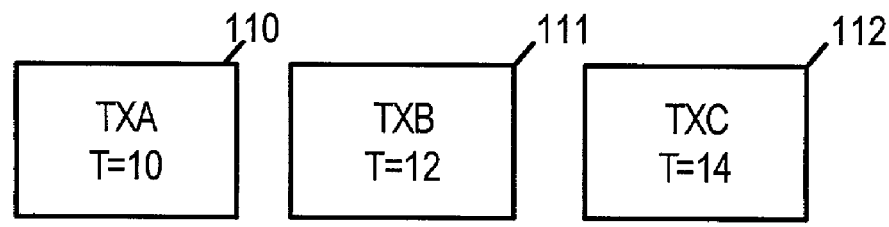

FIG. 1 is a block diagram showing a data item version 100, transactions have updated the data item version 100, and the removed-data information maintained for the data item version 100 according to an embodiment of the invention.

Data item version 100 contains data 106 and has removed-data information associated with it. The removed-data information consists of the MOST-RECENT-INCLUSION-TIME 102, LATEST-MISSING-TRANSACTION 103, SEQUENCE-NUMBER-OF-MOST-RECENT-MISSING-CHANGE 104, and a OTHER-TRANSACTIONS-ROLLED-OUT-INDICATOR 105.

To illustrate how the various components of the removed-data information are maintained, assume that three transactions have made updates to data item version 1100. These transactions are TXA 110, TXB 111, and TXC 112. TXA 110 committed at global system time of 10. TXB 111 committed at global system time of 12. TXC 112 committed at global system time of 14.

Assume that data item version 100 is the current data version, in which case MOST-RECENT-INCLUSION-TIME will be infinity, the LATEST-MISSING-TRANSACTION will be zeroed out and the OTHER-TRANSACTIONS-ROLLED-OUT-INDICATOR will not be set. The SEQUENCE-NUMBER-OF-MOST-RECENT-MISSING-CHANGE will be zeroed out.

Assume that rollouts are performed on data item version 100 to rollout all of TXC's changes. Also assume that TXC has made changes with sequence numbers 11, 25, 32, and 50. Now data item version 100 will have a MOST-RECENT-INCLUSION-TIME of 13, the commit time of TXC minus one, a LATEST-MISSING-TRANSACTION of TXB, a SEQUENCE-NUMBER-OF-MOST-RECENT-MISSING-CHANGE of 11, and the OTHER-TRANSACTIONS-ROLLED-OUT-INDICATOR is set because changes made by TXC have been rolled out of the data item version.

If some but not all of the changes made by TXB 111 are then rolled out of the data item version, one technique would be to set the LATEST-MISSING-TRANSACTION to the transaction that is currently reading data version 100 and to set the OTHER-TRANSACTIONS-ROLLED-OUT-INDICATOR to YES. The SEQUENCE-NUMBER-OF-MOST-RECENT-MISSING-CHANGE would be set to the reader's SEQUENCE-NUMBER-OF-LAST-CHANGE plus 1. If the reader's query context had no transaction id active (i.e., at the time the snapshot was taken the transaction had made no changes) then the SEQUENCE-NUMBER-OF-MOST-RECENT-MISSING-CHANGE would not be set to the reader's SEQUENCE-NUMBER-OF-LAST-CHANGE plus 1 since doing this would not be necessary.

As stated before, the above fields are used to maintain information for the removed data and hence, they are collectively referred to as the removed-data information. However, the removed-data information is not sufficient to determine if changes were made to the current version of the data item subsequent to a data item version being cloned.

Data Maintained for a Query

Every query has a context, which describes its execution environment. According to one embodiment, the context information associated with every query includes the following:

1) Time-Indicating-Snapshot-Query-Must-See:

indicates the time associated with the snapshot, of the database, that the query must see. For example, if the query's TIME-INDICATING-SNAPSHOT-QUERY-MUST-SEE is 10, then the query must see all changes that were committed to the database at or before T=10, and cannot see any changes that were committed to the database after T=10. The TIME-INDICATING-SNAPSHOT-QUERY-MUST-SEE is usually set at the time a query is started and is usually set to the current value of the system global time.

2) Transaction-That-Query-Belongs-To:

if the query is a part of a transaction, TRANSACTION-THAT-QUERY-BELONGS-TO identifies the transaction. If the query is not a part of a transaction, then the TRANSACTION-THAT-QUERY-BELONGS-TO is not used.

3) Sequence-Number-of-Last-Change:

the sequence number of the highest change, which the query must see that was made by the transaction to which the query belongs.

Computations

The CLONE-TIME and LAST-TO-SEE-TIMESTAMP may be used in a system that maintains the removed-data information and query context information described above to efficiently identify a data item version to supply to a query.

As shall be described in greater detail hereafter, this information may be used not only to identify which data item versions may be used, but also to identify which data item versions would require the fewest rollouts. These computations involve the removed-data information that is associated with the data item versions and the context information associated with queries. These computations are as follows:
1. Snapshot time <=MOST-RECENT-INCLUSION-TIME &&
2. LAST-TO-SEE-TIMESTAMP <=CLONE-TIME &&
3. (TRANSACTION-THAT-QUERY-BELONGS-TO indicates no transaction for query||
no LATEST-MISSING-TRANSACTION for clone||
TRANSACTION-THAT-QUERY-BELONGS-TO<>LATEST-MISSING-TRANSACTION) then data item version may be used.

The above logic used the following symbols as indicated below:
1) "=" is equals
2) "<" is less than
3) ">" is greater than
4) "<>" is not equal to
5) ">=" is used for greater than or equal to
6) "<=" is less than or equal to
7) && is AND logic
8) || is OR logic The Vector According to one embodiment, a vector of information is provided to enable the Distributed Lock Manager (hereinafter referred to as DLM) to determine which node is the best candidate for having a data item version that will satisfy a query's needs with a minimal amount of work. The vector is associated with a particular data item and contains information about the data item versions of that particular data item. Specifically, the vector contains a list of node identifiers for all the nodes in the cluster, and associates CLONE-TIMES with these node identifiers for all the data item versions for that particular data item on each node.

Figure 3:
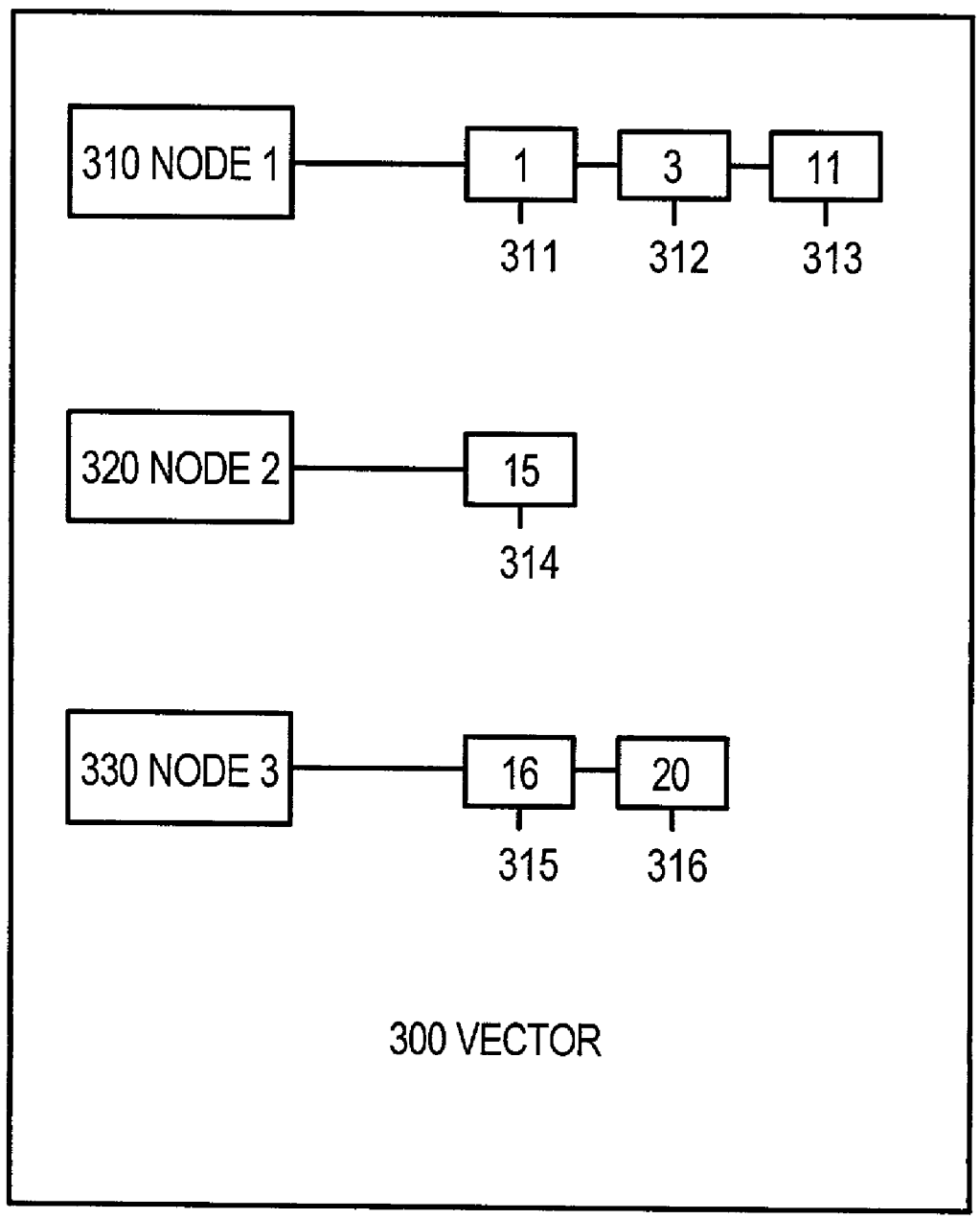
FIG. 3 is a block diagram of a vector.

For example, referring to FIG. 3, a vector 300 for a particular data item has three nodes: node 1 310, node 2 320, node 3 330. Node 1 310 contains three versions of the particular data item in its cache. Those data item versions each have a CLONE-TIME associated with them. The CLONE-TIMES are reflected in vector 300 and associated with node 1 310. Specifically, clone-time-to-node-to-vector association 311, contains the CLONE-TIME of 1, clone-time-to-node-to-vector association 312 contains the CLONE-TIME of 3, and clone-time-to-node-to-vector association 313 contains the CLONE-TIME of 11.

Node 2 320 contains one data item version in its cache. The data item version has a CLONE-TIME of 15, which is reflected in vector 300 and associated with node 2 320. The clone-time-to-node-to-vector association 314 contains the CLONE-TIME of 15.

Node 3 330 contains two data item versions in its cache. These data item versions each have a CLONE-TIME associated with them, which are reflected in vector 300 and associated with node 2 330. The clone-time-to-node-to-vector association 315 contains the CLONE-TIME of 16, and clone-time-to-node-to-vector association 316 contains the CLONE-TIME of 20.

Using the Vector to Locate the Best Candidate

Figure 4:
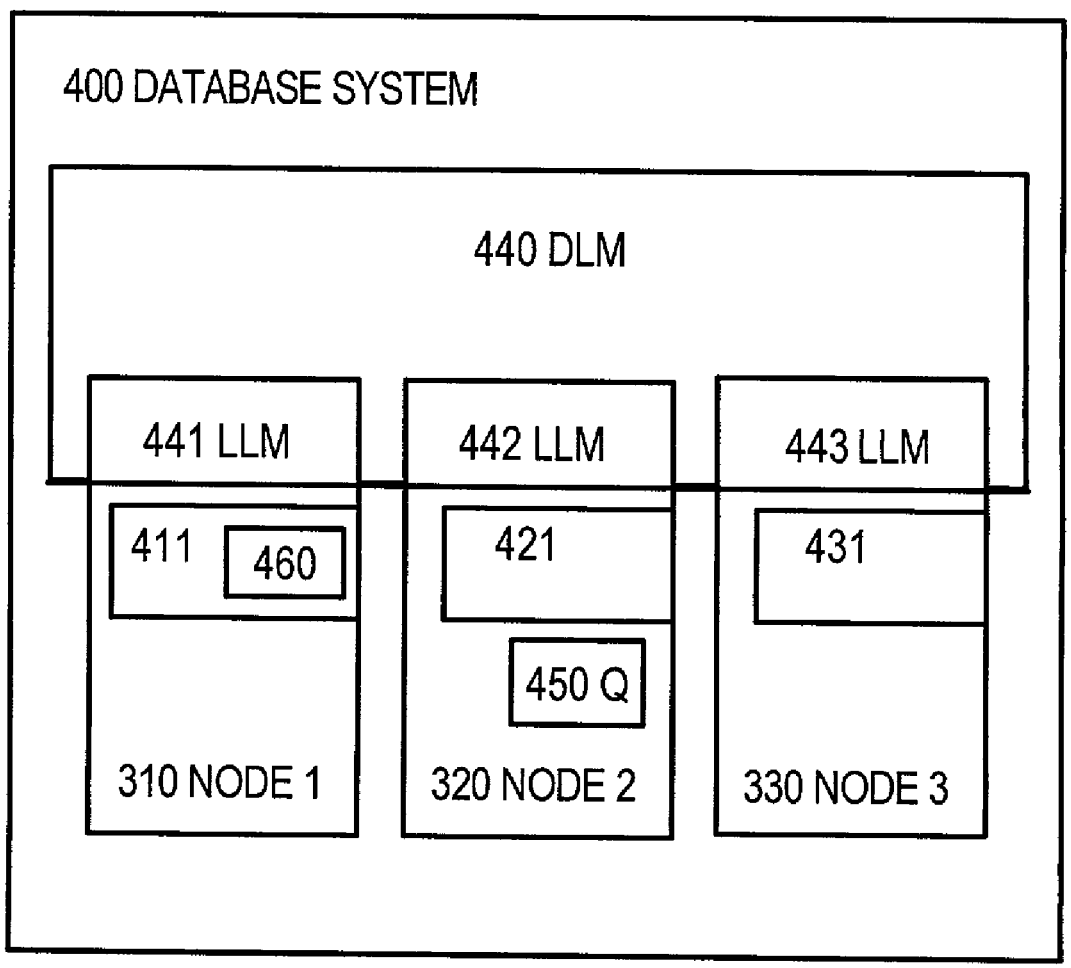
FIG. 4 is a block diagram of a database system according to an embodiment of the invention.

Data item versions that include everything that a query must see are candidates for supply to the query. While any candidate will work, it is generally preferable to select the best candidate. In general, a first candidate is better than a second candidate if less overhead is required to supply the first candidate to the query than is required to supply the second candidate. One component of the overhead involves rolling out changes that the query cannot see. In general, the fewer the changes that need to be rolled out, the better the candidate. FIG. 4 depicts a database system 400, which has three nodes (node 1 310, node 2 320, node 3 330) a Distributed Lock Manager (e.g. DLM) 440. Each node has a local lock manager (hereinafter referred to as LLM) that is associated with the DLM 440 and a cache.

Node 1 310 has cache 411 and LLM 441. Node 2 320 has cache 421 and LLM 442. Node 3 330 has cache 431 and LLM 443. LLMs 441, 442, and 443 are not only associated with the three nodes (310, 320, 330) but also with the DLM 440.

For the purposes of the scenario, assume that the vector 300 in FIG. 3 is being used by the DLM 440. Secondly, assume that a query 450 is executing on node 2 320. The query 450, on node 2 320, has the following context values:

| | |
|---|---|
| LAST-TO-SEE-TIMESTAMP | 9 |
| TIME-INDICATING-SNAPSHOT-QUERY-MUST-SEE | 8 |
| TRANSACTION-THAT-QUERY-BELONGS-TO | TXB |
| SEQUENCE-NUMBER-OF-LAST-CHANGE | 71 |

On node 1 310, a data item version 460 is cloned in cache 411 after Query 450 starts to create data item version 460. Assume the following values are associated with data item version 460:

| | |
|---|---|
| CLONE-TIME | 12 |
| MOST-RECENT-INCLUSION-TIME | 9 |
| LATEST-MISSING-TRANSACTION | TXD |
| SEQUENCE-NUMBER-OF-MOST-RECENT-MISSING-CHANGE | 73 |
| OTHER-TRANSACTIONS-ROLLED-OUT-INDICATOR | not set |

Also assume that rollouts have not been performed so that the data item versions will have MOST-RECENT-INCLUSION-TIMEs that are equal to the CLONE-TIMEs in the clone-time-to-node-to-vectors depicted in FIG. 3.

Given the above assumptions, query 450 will request the data item from the DLM 440. DLM 330 will check the vector and find that node 1 310 has a MOST-RECENT-INCLUSION-TIME of 11 for a data item version associated with node 1 (Refer to FIG. 3, the CLONE-TIME in the clone-time-to-node-to-vector 313 is 11.). Since the MOST-RECENT-INCLUSION-TIME is the closest of all the MOST-RECENT-INCLUSION-TIME's to the query's LAST-TO-SEE-TIMESTAMP, DLM 440 will forward the query's request to node 1 310. Processing on Node 1 310, will proceed to scan the cache 411 to find a data item version that best suits the query's needs. The process does not assume that the data item version with the MOST-RECENT-INCLUSION-TIME 11 (refer to FIG. 3, the clone-time-to-node-vector 313) is the best choice because by the time the request for query 450 arrives at node 1 310, a better data item version may be available. In the illustrated scenario, that is exactly the case. Specifically, node 1 310 includes a data item version with a CLONE-TIME of 10, which is closer to the query's LAST-TO-SEE-TIMESTAMP of 9.

The computations, as outlined in the COMPUTATIONS section, are performed comparing the query's values against the data item version's values. Based on these computations, it is determined that data item version 460 will meet the needs of query 450 once rollouts are performed. The changes greater than 71 for SEQUENCE-NUMBER-OF-LAST-CHANGE would be rolled out and the number of the rollouts would depend on the sequence number of the changes. Since data item version 460 can be used to meet query 450's needs, data item version 460 will be shipped to node 2 320.

Other Applications

The present invention has many applications beyond those examples given herein. For example, the techniques described herein may be employed in any context in which data is maintained for a session in a system. The techniques may also be used in any multi-node system that keeps a distributed cache and needs to synchronize the data in the various caches that comprise the distributed cache.

Hardware Overview

Figure 5:
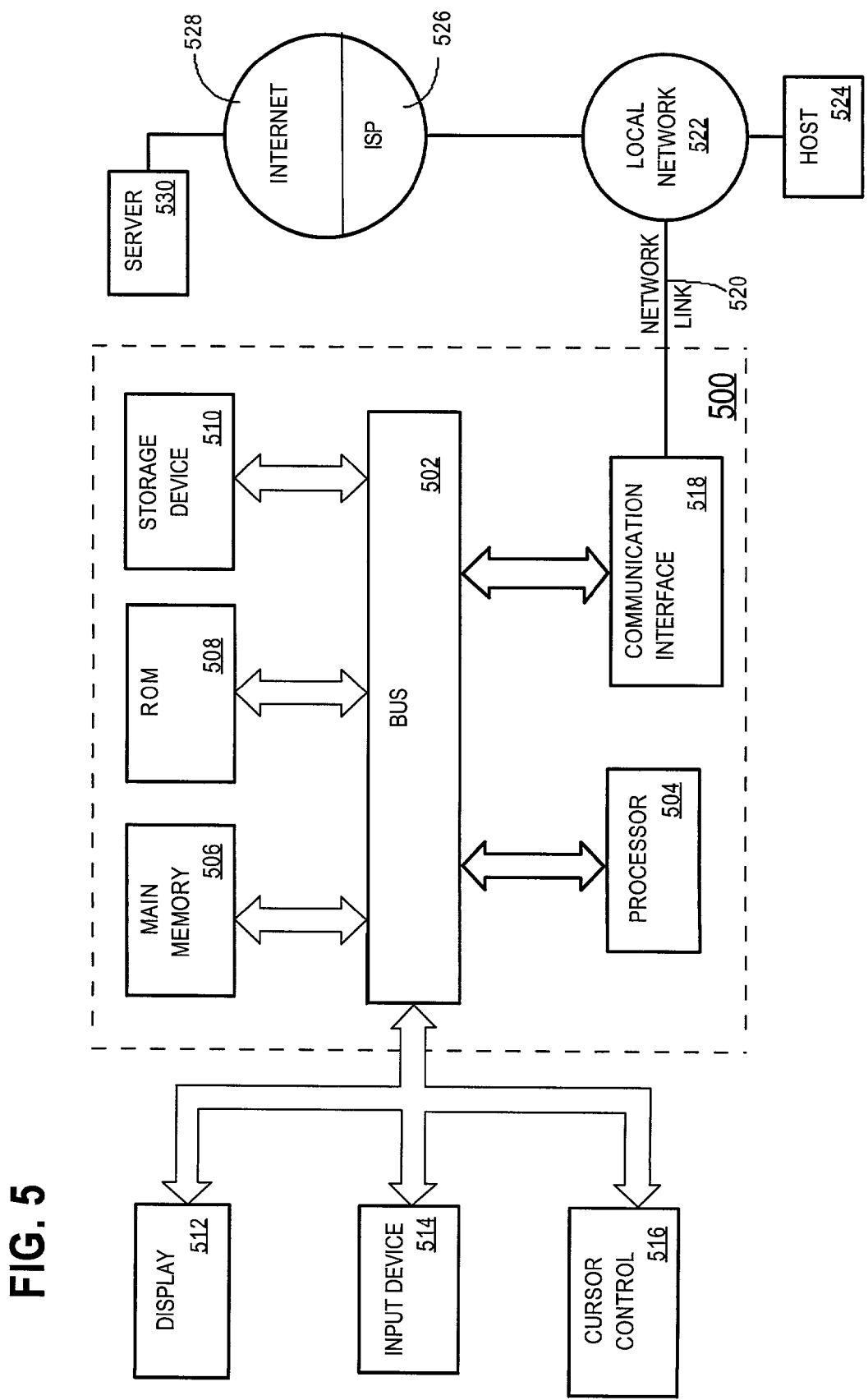
FIG. 5 is a block diagram of a computer system that may be used to implement an embodiment of the invention.

FIG. 5 is a block diagram that illustrates a computer system 500 upon which an embodiment of the invention may be implemented. Computer system 500 includes a bus 502 or other communication mechanism for communicating information, and a processor 503 coupled with bus 502 for processing information. Computer system 500 also includes a main memory 506, such as a random access memory (RAM) or other dynamic storage device, coupled to bus 502 for storing information and instructions to be executed by processor 503. Main memory 506 also may be used for storing temporary variables or other intermediate information during execution of instructions to be executed by processor 503. Computer system 500 further includes a read only memory (ROM) 508 or other static storage device coupled to bus 502 for storing static information and instructions for processor 503. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 513, including alphanumeric and other keys, is coupled to bus 502 for communicating information and command selections to processor 503. Another type of user input device is cursor control 516, such as a mouse, a trackball, or cursor direction keys for communicating direction information and command selections to processor 503 and for controlling cursor movement on display 512. The input device typically has two degrees of freedom in two axes, a first axis (e.g., x) and a second axis (e.g., y), that allows the device to specify positions in a plane.

The invention is related to the use of computer system 500 for selecting a particular version of a data item to be provided to a transaction. According to one embodiment of the invention, the selection of a particular version of a data item to be provided to a transaction is performed by computer system 500 in response to processor 503 executing one or more sequences of one or more instructions contained in main memory 506. Such instructions may be read into main memory 506 from another computer-readable medium, such as storage device 510. Execution of the sequences of instructions contained in main memory 506 causes processor 503 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 503 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 503 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 503 retrieves and executes the instructions. The instructions received by main memory 506 may optionally be stored on storage device 510 either before or after execution by processor 503.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 523 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for selecting a particular version of a data item to be provided to a transaction as described herein.

The received code may be executed by processor 503 as it is received, and/or stored in storage device 510, or other non-volatile storage for later execution. In the manner, computer system 500 may obtain application code in the form of a carrier wave.

CONCLUSION

The techniques described herein efficiently determine which data item versions can be supplied to a query, and may be used to determine which data item versions would require the least amount of work to satisfy the query, by:

1) associating a first new field with each clone, where the first new field indicates the time a data item version was current, 2) associating a second new field with each query, where the second new field indicates the last change made by a transaction that the query must see, and 3) using the value of the first new field of a clone, and the value of the second new field of the query, to determine whether the clone can be supplied to the query.

The mechanism has achieved the goal without:

1) broadcasting messages across all nodes in a cluster to trigger updates or invalidations of all non-current version of the data items of a data item, 2) obtaining locks, or 3) performing excessive rollouts.

Thus, the mechanism is able to provide an appropriate data item version to satisfy a query with a minimal amount of work.

What is claimed is:

1. A method comprising:
maintaining a LAST-TO-SEE-TIMESTAMP, associated with a session, which indicates a time of a last change made in the session that must be seen by the session;
maintaining with a data item version a CLONE-TIME that indicates a time at which a clone branch to which the data item version belongs was cloned from a current version of the data item;
determining that the data item version is to be supplied to the session based, at least in part, on a comparison between the CLONE-TIME and the LAST-TO-SEE-TIMESTAMP;
supplying the data item version to the session; and
setting said CLONE-TIME based on a CLONE-TIME of a non-current data item version when said data item version is cloned from said non-current data item version.

2. A method comprising:
maintaining a LAST-TO-SEE-TIMESTAMP, associated with a session, which indicates a time of a last change made in the session that must be seen by the session;
maintaining with a data item version a CLONE-TIME that indicates a time at which a clone branch to which the data item version belongs was cloned from a current version of the data item;
determining that the data item version is to be supplied to the session based, at least in part, on a comparison between the CLONE-TIME and the LAST-TO-SEE-TIMESTAMP;
supplying the data item version to the session;
performing at least one of: (a) presenting information that is based at least in part on the data item version that is supplied to the session, and (b) storing information that is based at least in part on the data item version that is supplied to the session;
wherein a plurality of nodes in a cluster have data item versions for said data item;
maintaining, for each node of said plurality of nodes, CLONE-TIME information for said data item; and
selecting which node to send a request for said data item to based on said CLONE-TIME information.

3. The method of claim 2 wherein the step of maintaining CLONE-TIME information includes maintaining, for said data item, a vector that associates nodes with CLONE-TIMES, wherein the CLONE-TIMES that are associated with a given node in the vector are CLONE-TIMES associated with data item versions that reside in the given node.

4. The method of claim 2, wherein the step of determining includes:
determining, based on removed-data information, whether changes that must be seen have been removed from said data item version; and
determining, based on said CLONE-TIME, whether information that must be seen was made to the current version of the data item after creation of the data item version.

5. A method comprising:
maintaining a LAST-TO-SEE-TIMESTAMP, associated with a session, which indicates a time of a last change made in the session that must be seen by the session;
maintaining with a data item version a CLONE-TIME that indicates a time at which a clone branch to which the data item version belongs was cloned from a current version of the data item;
determining that the data item version is to be supplied to the session based, at least in part, on a comparison between the CLONE-TIME and the LAST-TO-SEE-TIMESTAMP;
supplying the data item version to the session; and
performing at least one of: (a) presenting information that is based at least in part on the data item version that is supplied to the session, and (b)storing information that is based at least in part on the data item version that is supplied to the session;
wherein a transaction that includes a query is executing in the session;
wherein the LAST-TO-SEE-TIMESTAMP is associated with the query and indicates a time of a last change made by the transaction that must be seen by the query; and
wherein the step of determining that the data item version is to be supplied to the session is performed by determining that the data item version is to be used to answer the query.

6. The method of claim 5, further comprising setting said CLONE-TIME based on a global clock when said data item version is cloned.
selecting which node to send a request for said data item to based on said CLONE-TIME information.

7. The method of claim 5, wherein the step of determining includes selecting, based on said comparison between the CLONE-TIME and the LAST-TO-SEE-TIMESTAMP, the data item version from a plurality of data item versions that qualify to be supplied to the session.

8. A method comprising:

maintaining, for a plurality of data item versions that reside in a plurality of nodes, CLONE-TIME information that indicates when the data item versions were current;

wherein, for each data item version of the plurality of data item versions, the CLONE-TIME information for that data item version indicates a time at which a clone branch to which that data item version belongs was cloned from a current version of a particular data item;

determining, based at least in part on said CLONE-TIME information, which data item versions of said plurality of data items versions contain all changes that must be seen by a query;

selecting a data item version to supply to said query from those data item versions that contain all changes that must be seen by said query;

supplying the data item version to said query; and performing at least one of: (a) presenting information that is based at least in part on the data item version that is supplied to the query, and (b) storing information that is based at least in part on the data item version that is supplied to the query;

wherein the step of determining includes:

determining, based on a CLONE-TIME associated with said data item version, whether changes that must be seen by said query have been made to said particular data item after creation of said data item version; and determining, based on a MOST-RECENT-INCLUSION-TIME associated with said data item version, whether changes that must be seen by said query have been removed from said data item version.

9. The method of claim 8 wherein the step of selecting includes using the CLONE-TIME information to select a candidate that requires fewer changes to be removed than other candidates.

10. A computer-readable storage medium comprising instructions executable by one or more processors to instruct the one or more processors to perform steps comprising:

maintaining a LAST-TO-SEE-TIMESTAMP, associated with a session, which indicates a time of a last change made in the session that must be seen by the session;

maintaining with a data item version a CLONE-TIME that indicates a time at which a clone branch to which the data item version belongs was cloned from a current version of the data item;

determining that the data item version is to be supplied to the session based, at least in part, on a comparison between the CLONE-TIME and the LAST-TO-SEE-TIMESTAMP; supplying the data item version to the session;

supplying the data item version to the session; and setting said CLONE-TIME based on a CLONE-TIME of a non-current data item version when said data item version is cloned from said non-current data item version.

11. A computer-readable storage medium comprising instructions executable by one or more processors to instruct the one or more processors to perform steps comprising:

maintaining, for a plurality of data item versions that reside in a plurality of nodes, CLONE-TIME information that indicates when the data item versions were current;

wherein, for each data item version of the plurality of data item versions, the CLONE-TIME information for that data item version indicates a time at which a clone branch to which that data item version belongs was cloned from a current version of a particular data item;

determining, based at least in part on said CLONE-TIME information, which data item versions of said plurality of data items versions contain all changes that must be seen by a query;

selecting a data item version to supply to said query from those data item versions that contain all changes that must be seen by said query;

supplying the data item version to said query; and performing at least one of: (a) presenting information that is based at least in part on the data item version that is supplied to the query, and (b) storing information that is based at least in part on the data item version that is supplied to the query;

determining, based on a CLONE-TIME associated with said data item version, whether changes that must be seen by said query have been made to said particular data item after creation of said data item version; and determining, based on a MOST-RECENT-INCLUSION-TIME associated with said data item version, whether changes that must be seen by said query have been removed from said data item version.

12. A computer-readable storage medium comprising instructions executable by one or more processors to instruct the one or more processors to perform steps comprising:

maintaining, for a plurality of data item versions that reside in a plurality of nodes, CLONE-TIME information that indicates when the data item versions were current;

wherein, for each data item version of the plurality of data item versions, the CLONE-TIME information for that data item version indicates a time at which a clone branch to which that data item version belongs was cloned from a current version of a particular data item;

determining, based at least in part on said CLONE-TIME information, which data item versions of said plurality of data items versions contain all changes that must be seen by a query;

selecting a data item version to supply to said query from those data item versions that contain all changes that must be seen by said query;

supplying the data item version to said query; and performing at least one of: (a) presenting information that is based at least in part on the data item version that is supplied to the query, and (b) storing information that is based at least in part on the data item version that is supplied to the query;

wherein the step of selecting includes using the CLONE-TIME information to select a candidate that requires fewer changes to be removed than other candidates.

13. A computer-readable storage medium comprising instructions executable by one or more processors to instruct the one or more processors to perform steps comprising:

maintaining a LAST-TO-SEE-TIMESTAMP, associated with a session, which indicates a time of a last change made in the session that must be seen by the session;

maintaining with a data item version a CLONE-TIME that indicates a time at which a clone branch to which the data item version belongs was cloned from a current version of the data item;

determining that the data item version is to be supplied to the session based, at least in part, on a comparison between the CLONE-TIME and the LAST-TO-SEE-TIMESTAMP;

supplying the data item version to the session; and performing at least one of: (a) presenting information that is based at least in part on the data item version that is supplied to the session, and (b) storing information that is based at least in part on the data item version that is supplied to the session;

wherein a transaction that includes a query is executing in the session;

wherein the LAST-TO-SEE-TIMESTAMP is associated with the query and indicates a time of a last change made by the transaction that must be seen by the query; and wherein the step of determining that the data item version is to be supplied to the session is performed by determining that the data item version is to be used to answer the query.

14. The computer-readable storage medium of claim 13, wherein the steps further comprise setting said CLONE-TIME based on a global clock when said data item version is cloned.

15. The computer-readable storage medium of claim 13, wherein the step of determining includes selecting, based on said comparison between the CLONE-TIME and the LAST-TO-SEE-TIMESTAMP, the data item version from a plurality of data item versions that qualify to be supplied to the session.

16. A computer-readable storage medium comprising instructions executable by one or more processors to instruct the one or more processors to perform steps comprising:

maintaining a LAST-TO-SEE-TIMESTAMP, associated with a session, which indicates a time of a last change made in the session that must be seen by the session;

maintaining with a data item version a CLONE-TIME that indicates a time at which a clone branch to which the data item version belongs was cloned from a current version of the data item;

determining that the data item version is to be supplied to the session based, at least in part, on a comparison between the CLONE-TIME and the LAST-TO-SEE-TIMESTAMP;

supplying the data item version to the session; and performing at least one of: (a) presenting information that is based at least in part on the data item version that is supplied to the session, and (b) storing information that is based at least in part on the data item version that is supplied to the session;

wherein a plurality of nodes in a cluster have data item versions for said data item;

maintaining, for each node of said plurality of nodes, CLONE-TIME information for said data item; and selecting which node to send a request for said data item to based on said CLONE-TIME information.

17. The computer-readable storage medium of claim 16, wherein the step of maintaining CLONE-TIME information includes maintaining, for said data item, a vector that associates nodes with CLONE-TIMES, wherein the CLONE-TIMES that are associated with a given node in the vector are CLONE-TIMES associated with data item versions that reside in the given node.

18. The computer-readable storage medium of claim 16, wherein the step of determining includes:

determining, based on removed-data information, whether changes that must be seen have been removed from said data item version; and determining, based on said CLONE-TIME, whether information that must be seen was made to the current version of the data item after creation of the data item version.

* * * * *